June 30, 1964 T. W. TECHLER 3,139,041
REGENERANT INJECTOR
Filed April 17, 1961

INVENTOR
THOMAS W. TECHLER
BY John E. Stryker
ATTORNEY

United States Patent Office

3,139,041
Patented June 30, 1964

3,139,041
REGENERANT INJECTOR
Thomas W. Techler, North St. Paul, Minn., assignor to Union Tank Car Company, Chicago, Ill., a corporation of New Jersey
Filed Apr. 17, 1961, Ser. No. 103,457
2 Claims. (Cl. 103—272)

This invention relates to improvements in regenerant injectors of the type used in water softening apparatus having a bed of ion exchange resins which must be regenerated periodically. In order to minimize waste of regenerant and water during the regenerating and rinsing cycle while restoring full capacity of the ion exchange resins in such water softeners, a predetermined quantity of regenerant fluid of a predetermined potency must be caused to flow through the bed at a predetermined rate which is dependent upon the diameter of the resin container and depth of the resin bed therein, as well as the capacity of resin being used. Water softeners of this type must be designed to operate at line pressures within the range 15 p.s.i. to about 120 p.s.i.

Heretofore, variations in the pressure of the water supplied to the injector inlet have adversely affected the efficiency of the regenerating operation because of the failure of the injectors to maintain a substantially uniform, predetermined, rate of flow under variations in line pressure. Thus the rate of flow of regenerant from ordinary injectors to and through the resin bed has varied as a function of the line pressure to a degree that has caused inefficient and incomplete regeneration and/or excessive consumption of water in the regeneration-rinse cycle.

A measure of the efficiency of such regenerating operations is the number of grains of hardening salts that are removed per pound of regenerant. For example, in a water softener utilizing a high capacity ion exchange resinous material as the softening material and wherein the regenerant is sodium chloride brine it is feasible to remove from 2,000 to 2,200 grains of hardening salts (calcium carbonate equivalent) per pound of salt. A suitable quantity of salt in solution is caused to flow through the resin bed at a rate which is particularly suited to the diameter of the softener tank and amount of resinous softening material contained therein.

Another important factor in economical operation is the quantity of water used in the regenerating cycle. It is obviously desirable to completely regenerate the bed of water softening material and return it to full capacity by the use of a minimum quantity of water for the brining and flushing cycle.

It is the principal object of my invention to provide an injector which compensates for variations in the line pressure and is operative to supply a predetermined quantity of regenerant per minute to the resin bed when water under any line pressure within the range 15–120 p.s.i. is supplied to the injector nozzle.

A particular object is to provide an injector of the class described with a nozzle member having a flexible elastic washer defining a flow control orifice which is subject to restrictive deformation in response to changes in pressure in the inlet chamber of the injector when in operation whereby a substantially uniform rate of flow of regenerant to and through the bed of resinous material is maintained throughout a predetermined range of line pressure changes.

Referring to the accompanying drawing which illustrates a preferred embodiment of my invention:

Figure 1:
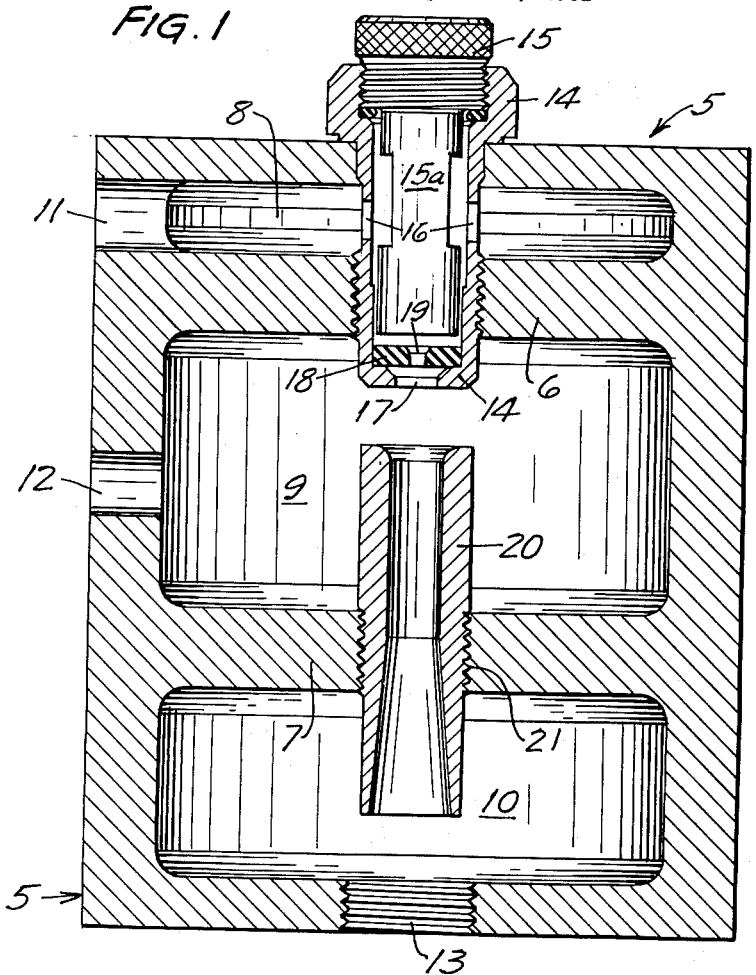
FIGURE 1 is a central longitudinal section through an injector embodying my invention and showing the deformable orifice member in its position when subject to atmospheric pressure.

Referring to the drawing, a suitable casing or casing means is indicated generally by the numeral 5 and is divided by partition members 6 and 7 into an inlet chamber 8, a suction chamber 9 and an outlet chamber 10. Water or other liquid under line pressure may be supplied to the chamber 8 through a port 11 and brine or other regenerant may be supplied to the suction chamber 9 through a port 12, while dilute regenerant solution may be discharged from the chamber 10 through outlet port 13.

Figure 2:
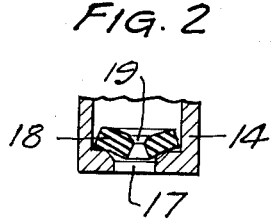
FIG. 2 is a fragmentary longitudinal section showing the nozzle and orifice member deformed to restrict the flow to the venturi tube under low inlet pressure.
Figure 3:
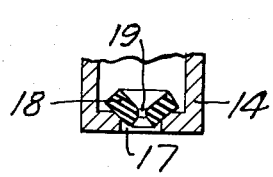
FIG. 3 shows the condition of the flow control washer when the fluid is supplied to the inlet chamber under relatively high pressure.

A flow passage between the chambers 8 and 9 is defined by an elongated tubular nozzle member 14 having a sealed connection with the outer wall of casing 5 and a threaded connection with the partition 6. This nozzle member extends to the exterior of the casing 5 and is closed at its outer end by a threaded plug 15. Passages 16 place the chamber 8 in continuous communication with the interior of the nozzle member 14. At its lower end the member 14 is formed with an outlet opening 17 surrounded by an annular seat for an elastic resilient washer 18 formed with a central orifice 19. The seat for this washer has a truncated conical surface for contact with the washer when it is extended by pressure as indicated in FIGS. 2 and 3. The rate of flow through the orifice 19 resulting from the pressure drop from chamber 8 to chamber 10 remains substantially constant under variations in pressure of the liquid in the inlet chamber 8. A suitable flow control device for this injector is described in Patent No. 2,454,929, dated November 30, 1948.

To prevent the washer 18 from being dislodged from its seat when the direction of flow through the injector is reversed, a tubular member 15a is mounted coaxially within the nozzle member 14 and has an open lower end disposed adjacent to but out of contact with the washer 10. The upper end of the member 15a is connected to the plug 15, and openings in the sides of the tubular member 15a adjacent to the passages 16 allow free flow of liquid to the nozzle orifice 19.

Mounted in a threaded opening in the partition member 7 is a venturi tube 20 having an inlet end disposed in suitably spaced relation to the opening 17 in the nozzle member 14. The tube 20 is disposed in axial alignment with the nozzle opening 17 and orifice 19 so that the required subatmospheric pressure or suction is created in the chamber 9 to draw brine from a suitable source into the injector. The high velocity stream of liquid from the nozzle opening 17 is thereby discharged into the venturi tube 20 and is injected, together with the brine drawn from the chamber 9, from the outlet end of the venturi tube 20, through the chamber 10 and port 13. During this normal operation of the injector the pressure in the chamber 10 and port 13 is low, i.e. on the order of 1–3 p.s.i.

This outlet port may be connected either to the top or bottom distributor of the water treatment tank. Most treatment tanks are cylindrical in shape and are disposed with their axes vertical so that flow from the distributors is substantially uniform through a predetermined quantity of ion exchange resinous material contained in the tank.

By the use of my invention highly efficient regeneration has been obtained with a minimum consumption of water and brine in each regeneration cycle. For example, in one series of tests of a water softener of commercial size, i.e., containing nine cubic feet of high capacity ion exchange resin, the hard water contained 18–20 grains of calcium carbonate per gallon of water, a 1½ inch control valve was used, and the water pressure ranged from 30 p.s.i. to 90 p.s.i. The flow control washer 18 of the injector for this series of tests maintained a constant flow rate equal to approximately 2.4 g.p.m. Prior to regeneration, the ion exchange material in the softener was exhausted for each test until the effluent contained from 1–3 grains of $CaCO_3$ per gallon. Thereupon regeneration was conducted for a period equal to approximately 60 minutes and a substantially saturated NaCl brine in an amount equal to 54 gallons was used in the regeneration cycle for each test. It was found that for each pound of NaCl used in the several regenerating cycles from 2020 to 2144 grains of $CaCO_3$ had been removed from the softening material bed.

The total quantity of water used in regenerating and flushing the bed in these tests was considerably less than that required for the same size softening material bed when an ordinary fixed orifice injector was used. Moreover, the efficiency in the consumption of regenerant in these tests was substantially higher than that obtained when injectors of the fixed orifice type were used.

I claim:
1. An injector comprising; casing means defining an inlet chamber having an inlet port, a suction chamber having a fluid draw port and an outlet chamber having an outlet port; a tubular nozzle member defining a flow passage from said inlet chamber to said suction chamber, said nozzle having an outlet end opening surrounded by a substantially conical seat; a venturi tube disposed in spaced axial alignment with said nozzle member and defining a flow passage from said suction chamber to said outlet chamber; and a flexible elastic washer defining a restricted orifice in said nozzle member, said washer being deformable under variable fluid pressure in said inlet chamber to engage said seat and contract said orifice whereby to maintain a substantially uniform rate of flow from said inlet chamber to said outlet chamber through said venturi tube when fluid under pressures which vary over a predetermined range is supplied to said inlet chamber and a relatively low pressure is maintained in said outlet chamber.

2. An injector in accordance with claim 1 in which said tubular nozzle member defining a flow passage from said inlet chamber to said suction chamber extends to the exterior of said casing means and is removable as a unit therefrom, said member having an opening in its exterior end to allow access to said flexible elastic washer, and a removable closure for said exterior end opening.

References Cited in the file of this patent

UNITED STATES PATENTS

| | | |
|---|---|---|
| 363,004 | Schutte | May 17, 1887 |
| 1,653,954 | Friedmann et al. | Dec. 27, 1927 |
| 2,620,134 | Obermaier | Dec. 2, 1952 |
| 2,775,984 | Dahl | Jan. 1, 1957 |
| 2,937,802 | Fisher | May 24, 1960 |
| 2,957,494 | Stenberg | Oct. 25, 1960 |